United States Patent [19]

Ribeiro et al.

[11] Patent Number: 5,628,577
[45] Date of Patent: May 13, 1997

[54] WRIST PIN FOR A TWO-PIECE PISTON

[75] Inventors: José Do Ribeiro, Ann Arbor, Mich.; Luis M. Lopes; José M. Leites, both of São Paulo - SP, Brazil

[73] Assignee: Metal Leve S.A. Industria E Comercio, Sao Paulo-SP, Brazil

[21] Appl. No.: 260,556

[22] Filed: Jun. 16, 1994

[30] Foreign Application Priority Data

Mar. 8, 1994 [BR] Brazil ................................ 94007179

[51] Int. Cl.$^6$ ................................................. F16C 9/00
[52] U.S. Cl. ...................... 403/150; 403/157; 403/151; 92/187
[58] Field of Search .......................... 403/150, 151, 403/152, 153, 154, 155, 156, 157, 158, 161, 24; 92/187

[56] References Cited

U.S. PATENT DOCUMENTS

| 1,772,187 | 8/1930 | Manning ...................... 403/151 X |
| 2,483,674 | 10/1949 | Rosen et al. ................. 92/187 X |
| 2,687,930 | 8/1954 | Smity ......................... 92/187 X |
| 2,703,264 | 3/1955 | Pitner ........................ 403/150 X |
| 4,359,913 | 11/1982 | Mahlke ....................... 403/150 X |
| 4,756,240 | 7/1988 | Mielke . | |
| 5,421,245 | 6/1995 | Christoffel et al. ............ 92/187 |

FOREIGN PATENT DOCUMENTS

| 0106935 | 5/1984 | European Pat. Off. . | |
| 3826746 | 3/1989 | Germany . | |
| 528930 | 11/1940 | United Kingdom ........... 403/153 |
| 680416 | 10/1952 | United Kingdom ........... 403/154 |
| 2148451 | 5/1985 | United Kingdom . | |

Primary Examiner—Harry C. Kim
Attorney, Agent, or Firm—Darby & Darby, PC

[57] ABSTRACT

Wrist pin for a two-piece piston, having a cylindrical external surface (41) and an internal surface with an internal diameter, throughout the length of the pin (40). The end portions of the pin have a reduced internal wall thickness between the outer half of the supporting face of the bosses (50), where there exclusively occur bending moment and shearing force applied by the inertia of the skirt (20) and of the moving assembly (100). The reduction in the internal wall thickness is obtained by the increase in the internal diameter of the pin (40) at the end portions, through two different end revolution surfaces (43, 44) each having respective a generatrix which is at least substantially straight.

13 Claims, 2 Drawing Sheets

WRIST PIN FOR A TWO-PIECE PISTON

FIELD OF THE INVENTION

The present invention refers to a light weight, yet highly resistant, wrist pin, applicable to connect the parts of an articulated or two-piece piston, and for coupling such piston to a connecting rod in an internal combustion engine.

BACKGROUND OF THE INVENTION

In recent times, each one of the parts that comprise the assembly including the piston top, the piston skirt, the connecting rod and the wrist pin, to pivotally interconnect these parts, have been exhaustively studied, aiming a reduction in weight. This is to reduce the power losses caused by such moving metal parts and, therefore, take advantage of all the energy generated in the cylinder so as to decrease the fuel consumption and maintain the efficiency of the engine in desired levels.

Referring particularly to the wrist pin, it has traditionally been made of steel or iron. In the middle of the 1980's it was proposed to use plastics or polymers for its manufacture. A like proposal is found in the U.S. Pat. No. 4,430,906 of the Standard Oil Company.

However, in the most recent types of diesel engines having articulated pistons, the pressures and temperatures in the cylinder have increased by such an amount that it would be necessary to use sophisticated and very expensive polymers to meet such requirements of loads and temperatures.

Another approach for the problem is the reduction of material on walls of a conventional wrist pin made of steel or iron, as more recently disclosed in the U.S. Pat. No. 4,712,941, issued to Emmer and assigned to Chrysler Motors Corporation, as well as in U.S. Pat. No. 4,756,240, issued to Mielke and assigned to Kolbenschmidt. Alternatives of this type generally comply with most of the needs in terms of weight and resistance but, at the present time, they may be deemed improper, since the manufacturing methods are too complicated and therefore very costly.

More important than this is the fact that the known prior proposals do not provide a specific resistance which closely approximates the distribution of forces along the wrist pin length, which is different from that existing in like assemblies employing monolithic pistons, thereby resulting in pins unnecessarily heavy and inappropiate, as will be shown hereafter.

The present invention relates to a new and characteristic design of a wrist pin which is light yet highly resistant, applicable to connect the parts of an articulated or two-piece piston and for coupling the piston to a connecting rod in an internal combustion engine.

DISCLOSURE OF THE INVENTION

The wrist pin for a two-piece piston of the invention has a tubular shape, with a unique external cylindrical surface having end portions supported on respective holes of a piston skirt portion. Bending and shearing forces produced during the piston operation, by the hollow bosses of a piston top portion and by the connecting rod that are mounted around the pin, that have internal surfaces of different diameters. The internal surfaces comprise a median cylindrical surface, which extends radially, so to have its end edges spaced from the respective pin ends and are axially external to the pin regions submitted to higher bending and shearing forces produced by the bosses and connecting rod. There also is at least one end revolution surface, with a generatrix at least substantially rectilinear, defining the internal surface of the pin between each end edge of the median cylindrical surface and the adjacent pin end. Each end surface is radially aligned with the respective end portion of the external cylindrical surface of the pin and with the axially outer half of the respective boss of the top portion and defining a respective pin end portion presenting a wall thickness that is reduced in relation to the pin portion presenting the median cylindrical surface and dimensioned to support bending and shearing forces only, due to inertia and to lateral radial forces.

This construction provides a selective resistance to the wrist pin that approximates the bending moment and shearing force applied by the pin bosses of the piston, the piston skirt and the connecting rod as well, therefore resulting in a wrist pin for an articulated piston assembly which is light weight yet highly resistant and whose manufacture is possible at competitive costs.

According to a preferred embodiment of the invention, the internal end surface at each pin end is inclined, defining a frusto-conical surface whose larger base coincides with the adjacent end face of the pin. This permits oil intake from the cylinder wall towards the inside of the pin, thus improving the refrigeration of said pin. This better effect of refrigeration occurs more intensively when the end edge of each internal end surface coincides with the adjacent external end edge of the pin, turning null the radial thickness of the respective end face of the pin. In the articulated pistons, the lower portion or skirt has independent movements in relation to the top of the piece, and therefore the skirt will also be subjected to all the efforts applied by the pin, with no possibility of dissipating said efforts throughout the top. With the reduction of the mass obtained by removing material from the internal diameter of the present pin, there is achieved a substantial reduction in the inertia lateral force applied by the pin onto the skirt, thereby reducing the deformation of the skirt. This allows for a better conduction of the top through the skirt and a better adjustment of the assembly inside the cylinder through smaller gaps, which as it is known, cause, among other effects, a reduction of the engine noise.

BRIEF DESCRIPTION OF THE DRAWINGS

The invention will be described now, with reference to the attached drawings, in which.

DETAILED DESCRIPTION OF THE INVENTION

Turning to the drawings, it should be noted that some parts referred to above are not entirely represented, for purposes of clarity and that like parts bear like numerals.

Figure 1:
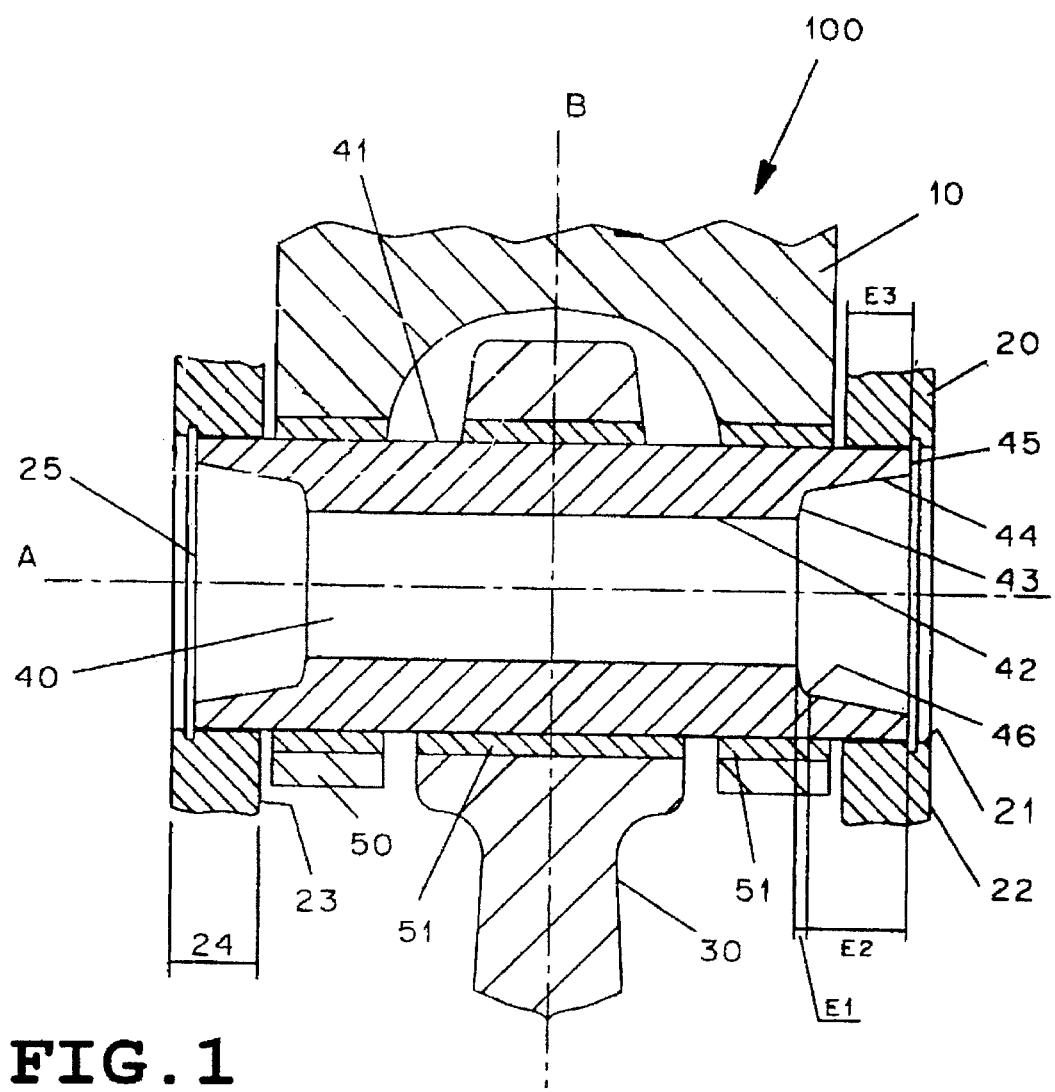
FIG. 1 is an axial sectional view of an assembly comprising a piston top portion pivotally connected to both a skirt and a connecting rod by a wrist pin.
Figure 1A:
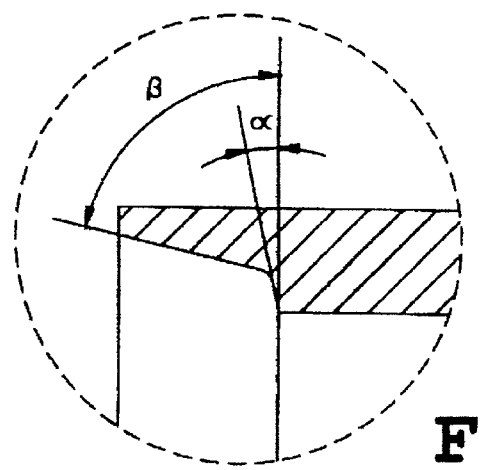
FIG. 1a is an enlarged view of an end portion of the wrist pin of FIG. 1.

FIG. 1 illustrates a movable assembly 100, comprising a piston top 10 that is pivotally connected, by the pin bosses 50, to both a piston skirt 20 and a connecting rod 30, through a wrist pin 40. The pin bosses 50 are provided with sliding means 51, aligned with a pair of skirt holes 21, so that there is independence of movements of the parts of the assembly 100.

Figure 2:
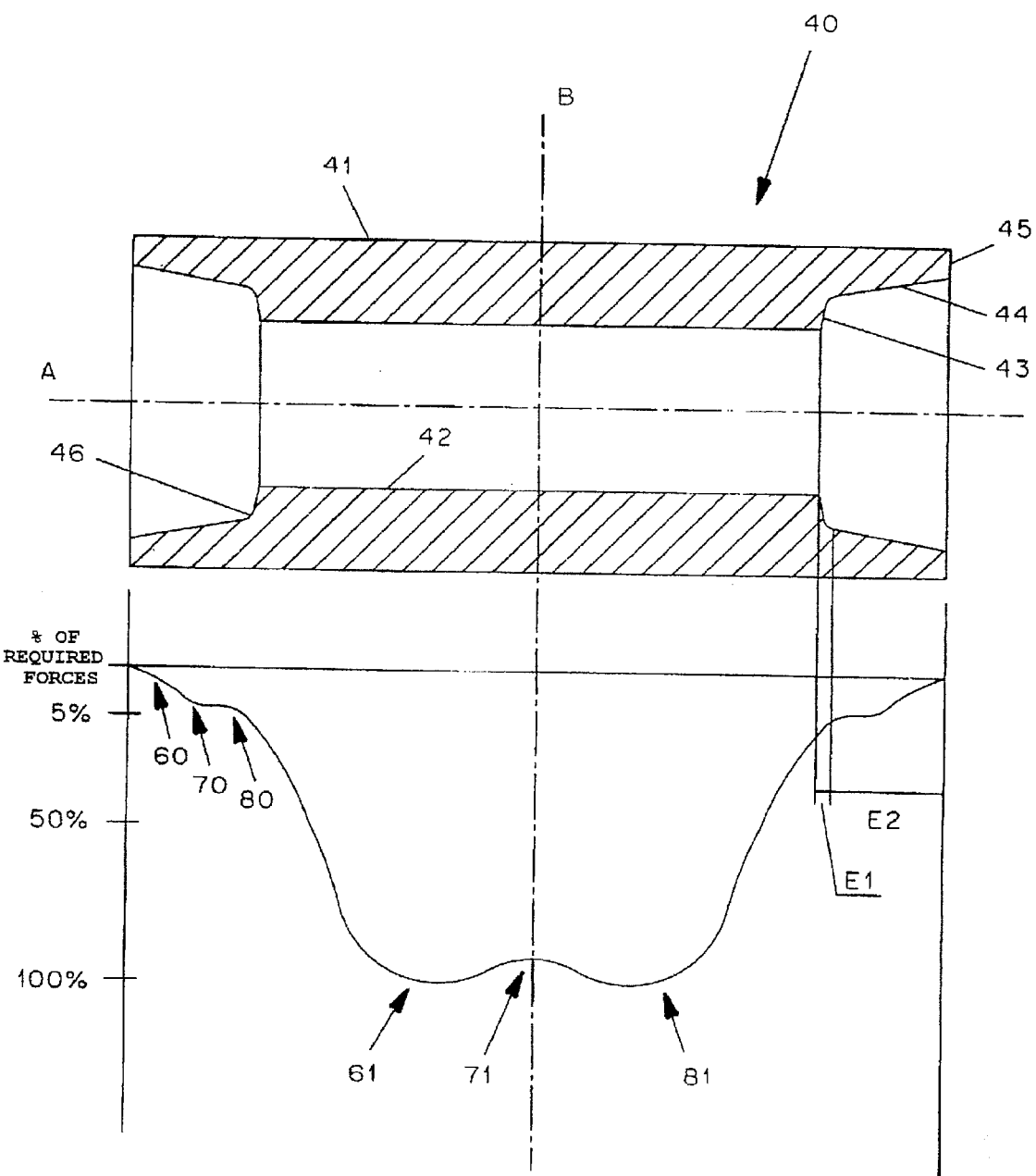
FIG. 2 shows the wrist pin of FIG. 1 and a diagram that represents the distribution of the resulting forces along its length.

Along the travel of the assembly 100 in the cylinder (not shown), the wrist pin 40 is subjected to various forces, having a resultant variation along its length, as represented in the diagram of FIG. 2. The resulting force has a longitudinal force, parallel to the geometric axis B of the piston and applied by the connecting rod 30 and bosses 50, as a consequence of the burn of air and fuel mixture above the piston top 10. There also are lateral and inertia forces, orthogonal to the geometric axes A of the pin 40 and B of the piston 10, said forces being produced by the kinetics and dynamics of the assembly 100 when the engine (not shown) is running.

Contrary to assemblies including pistons having a monolithic structure, it was discovered that the lateral and inertia forces imposed on the wrist pin 40, more particularly on its end portions between the outer half portion of the pin bosses 50 and the skirt 20 are insignificant. This is due to the independence of movements of the piston top 10 relative to the piston skirt 20 and the connecting rod 30, so that the resulting bending moment and shear force on such portions of the wrist pin 40 presents a maximum magnitude of approximately 8–15% of the longitudinal forces on the piston.

This is more clearly seen in the diagram of FIG. 2, that shows the curve of the resulting forces, with the longitudinal radial force, bending moment and shear force applied to the pin 40. It is important to observe that such distribution of forces is characteristic of an articulated piston assembly, irrespective of the pin assembled therein.

In the diagram of FIG. 2, numerals 60, 70 and 80 indicate the variation of the bending moment and lateral force, due to lateral forces on the end portions of the wrist pin 40 when the engine is running, while numerals 61, 71 and 81 indicate the longitudinal force and the bending moment, due to the longitudinal force in the same conditions. It is apparent from the diagram that the distribution of forces in the movable assembly 100 is very different from that found in similar movable assemblies employing monolithic pistons. In details, such difference is very outstanding at the central portions of the pin 40, at the regions corresponding to the valley 71, in which the forces do not decrease in an accentuated manner, as compared to the peaks 61 and 81, as it occurs in pins for monolithic pistons.

It is also apparent from the diagram of FIG. 2 that, at the end portions of the pin 40, the magnitude of forces at the points 60, 70 and 80 is insignificant when compared to those at the points 61, 71 and 81 of the central portions. This phenomenon occurs because the end portions of the wrist pin 40, more particularly between the outer half of the pin bosses 50 and the skirt 20, are exclusively subjected to inertia and lateral forces applied by the service area E3 of the skirt hole 21, due to the weight of the skirt 20, associated with the successive tilts of the connecting rod 30 when the movable assembly 100 is moving while the engine (not shown) is running.

Thus, due to the independence of movements of the parts of the movable assembly 100, the longitudinal force received by the piston top 10 is not transmitted to the wrist pin 40 at the end portions thereof.

The wall end portions of reduced thickness proposed by the invention provide a selective resistance to the wrist pin 40 that approximates to the bending moment and shearing force applied by the pin bosses 50, the piston skirt 20 and the connecting rod 30.

The reduction in the wall thickness at the ends of the pin 40 is advantageously obtained by the selective removal of material from the internal surfaces of the tubular pin.

According to the illustrated embodiment, the wrist pin 40 presents a tubular shape with a an external cylindrical surface 41. The pin internal surface includes: a median section cylindrical surface 42, which extends axially, in order to have its end edges spaced from the respective ends of the pin 40 and axially external to the regions of the pin 40 that are submitted to higher bending and shearing forces produced by the bosses 50 and connecting rod 30. The pin internal surface end revolution surfaces 43, 44 presenting straight, section or substantially straight generatrices, defining the internal surface portion of the pin between each end edge of the median cylindrical surface 42 and the adjacent pin end.

Both end surfaces 43, 44 comprise a first end surface 43, which extends from the adjacent end edge of the median cylindrical surface 42, in order to cause an increase in the internal diameter of the pin 40 and which presents its opposite end edge matching, usually through a small curved superficial portion 46, with a second end surface 44, inclinedly extending towards the adjacent end face 45 of the pin 40, causing an additional and progressive increase in the internal diameter of the pin 40.

Each first end surface 43 is provided at a region of the pin 40 radially aligned with the outer half of the supporting face of the bosses 50 and the internal wall 23 of the skirt 20, and each second end surface 44 being radially aligned with the supporting service area E3 of the respective skirt hole 21.

According to analysis on results of tests developed on testing bench, associated with mathematical studies, it has been proved that one favorable condition to withstand the bending moment and shear force with the minimum weight for the pin 40 is when the first end surface 43 is disposed according to the inclination of an angle $\alpha$ that varies from 0 to 45 degrees from the longitudinal axis of the piston and presents a longitudinal extension E1 from 0.5 to 3.5% of the piston diameter, the second end surface 44 being inclined according to an angle $\beta$, varying from 45 to 90 degrees from the longitudinal axis of the piston, so that, when $\alpha$ is maximum, $\beta$ is mimimum and vice-versa.

It has also been found advantageous that the first end surface 43 presents a longitudinal extension E1 from 0.5 to 3.5% of the piston diameter and the second end surface 44 a longitudinal extension E2 equal to or greater than that of the supporting service area E3 of the skirt hole 21, when the first end surface 43 is positioned near the outer half of the supporting face of the bosses 50. The end face 45 of the pin 40 should have its radial thickness dimensioned in such a way as to ensure the retention of the pin 40 by a circlip (not shown), which is inserted in a peripheral groove 25 close to the external wall 22 of the skirt 20, as well as to ensure the oil passage from the cylinder wall to the inside of the pin 40.

It should be further observed that both end surfaces 43, 44 may be defined by a unique conical surface, with its larger base being defined at the respective end face of the pin 40.

Since the embodiment herein disclosed for the end portions of the pin 40 produces a substantial reduction in weight, it is possible to provide the mid portions of the pin 40 with a constant wall thickness, which is more compatible with the slight reduction of the longitudinal force at the regions corresponding to the numerals 61, 71 and 81, allowing a relatively easy and low cost manufacture.

We claim:

1. A two-piece piston having a head portion with at least one hollow pin boss, a skirt portion with holes, a connecting rod, and a tubular wrist pin inserted through said at least one boss of the piston head portion, said holes of the skirt portion for being supported on a wall surrounding the holes of said skirt portion, and said connecting rod, wherein said wrist pin resists shearing forces applied to said wrist pin during piston operation by said at least one pin boss of the piston head portion, wherein an internal surface of the tubular wrist pin having a surface of revolution defined by:

a median section having a constant internal diameter throughout the length thereof; and end portions disposed at each end of said median section and terminating at respective free ends of said wrist pin, each of said end portions being defined by an end section extending from said free end and a transition section between said end section and said median section, said end section being defined by a tapered portion having an angle of inclination with respect to an axis transverse to a longitudinal axis of said wrist pin, and said transition section being defined by a tapered portion having an angle of inclination with respect to said transverse axis which is less than the angle of inclination of said end section.

2. A two-piece piston as in claim 1, wherein said angle of inclination of said transition section is between 0 to 45 degrees and said angle of inclination of said end section is between 45 to 90 degrees, and wherein when said angle of inclination of said transition section is maximum said angle of inclination of said end section is minimum and vice versa.

3. A two-piece piston as in claim 2, wherein the angle of inclination of the transition section is approximately 15 degrees and the angle of inclination of the end section is approximately 70 degrees.

4. A two-piece piston as in claim 2, wherein an end of said end section substantially coincides with an external end face of said wrist pin.

5. A two-piece piston as in claim 2, wherein said transition section has a longitudinal extension from 0.5% to 3.5% of a diameter of said piston.

6. A two-piece piston as in claim 1, wherein said tapered portion of said end section has a length greater than the depth of said hole of the piston skirt portion within which said end section of the pin is supported.

7. A two-piece piston as in claim 1, wherein said end portion has a curved junction connecting said transition section and said end section.

8. A two-piece piston as in claim 1, wherein said median section is disposed within said at least one pin boss.

9. A wrist pin for a two-piece piston to be inserted through at least one boss of a piston head portion, holes in a piston skirt portion for being supported on a wall surrounding said skirt portion holes, and a connecting rod, said wrist pin being adapted to resist shearing forces applied to said wrist pin during piston operation by said at least one pin boss of said piston head portion, wherein said wrist pin being tubular and having an internal surface of revolution defined by:

a median section having a constant internal diameter throughout the length thereof; and end portions disposed at each end of said median section and terminating at respective free ends of said wrist pin, each of said end portions being defined by an end section extending from said free end and a transition section between said end section and said median section, said end section being defined by a tapered portion having an angle of inclination with respect to an axis transverse to a longitudinal axis of said wrist pin, and said transition section being defined by a tapered portion having an angle of inclination with respect to said transverse axis which is less than the angle of inclination of said end section.

10. A wrist pin as in claim 9, wherein said angle of inclination of said transition section is between 0 to 45 degrees and said angle of inclination of said end section is between 45 to 90 degrees, and wherein when said angle of inclination of said transition section is maximum said angle of inclination of said end section is minimum and vice versa.

11. A wrist pin as in claim 10, wherein the angle of inclination of the transition section is approximately 15 degrees and the angle of inclination of the end section is approximately 70 degrees.

12. A wrist pin as in claim 9, wherein said tapered portion of said end section has a length greater than the depth of said hole of the piston skirt portion within which said end section of the pin is adapted to be supported.

13. A wrist pin as in claim 9, wherein said end portion has a curved junction connecting said transition section and said end section.

* * * * *